(No Model.)

W. H. ELVERSON.
Earthenware Vessel.

No. 233,664.          Patented Oct. 26, 1880.

Witnesses.
Thomas W. Bakewell
L. C. Fitler

Inventor.
William H. Elverson
by his attorneys
Bakewell & Kerr

UNITED STATES PATENT OFFICE.

WILLIAM H. ELVERSON, OF NEW BRIGHTON, PENNSYLVANIA, ASSIGNOR TO ELVERSON, SHERWOOD & CO.

EARTHENWARE VESSEL.

SPECIFICATION forming part of Letters Patent No. 233,664, dated October 26, 1880.

Application filed August 16, 1880. (No model.)

*To all whom it may concern:*

Be it known that I, WILLIAM H. ELVERSON, of New Brighton, in the county of Beaver and State of Pennsylvania, have invented a new and useful Improvement in Attaching Lugs and Projections to Earthenware and Similar Vessels; and I do hereby declare the following to be a full, clear, and exact description thereof, reference being had to the accompanying drawings, forming a part of this specification, in which—

Figure 1:
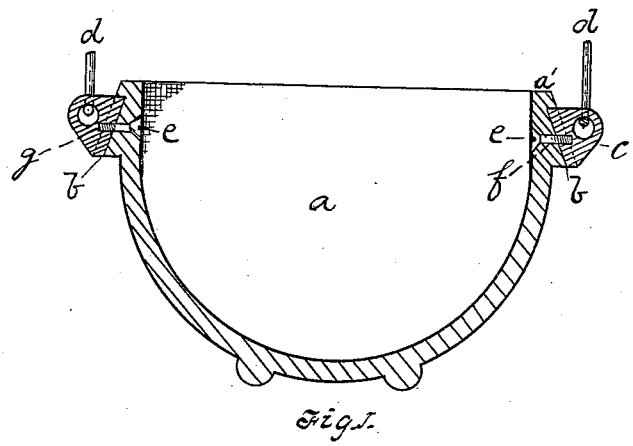
Figure 2:
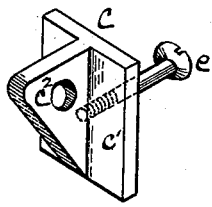
Figure 3:
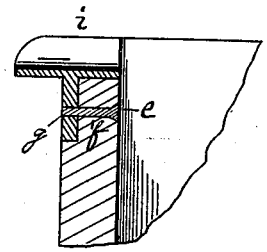

Figure 1 is a sectional view of an earthenware vessel provided with my improved lugs. Fig. 2 is a perspective view of the lug and fastening; and Fig. 3 is a sectional view of a pouring-spout attached to an earthenware vessel by my improved fastening.

Like letters of reference indicate like parts in each.

Much difficulty and loss have been experienced by the knocking and breaking off of the lugs, handles, and other like projections of earthenware, china, glass, and other similar fragile vessels; and my invention consists of a metallic lug, spout, or other projection having a plate or flat broad base fitting into a corresponding recess in the vessel and secured to the vessel by a screw passing through a suitable hole in the article and screwing into a hole in the base of the lug or other projection.

To enable others skilled in the art to make and use my invention, I will now describe its construction and manner of use.

Fig. 1 is a view of an earthenware vessel. As heretofore made this vessel has had earthenware lugs, to which the bail was attached. I make the rim $a'$ countersunk, as at $b$, to receive the flat base $c'$ of the metallic lug $c$. This lug has a hole, $c^2$, for the attachment of the bail $d$, and it is fastened to the vessel $a$ by a screw, $e$, passing through a hole, $f$, in the vessel from the inside, and screwed into a hole, $g$, in the rear side of the lug. The lug $c$ can be tightened or loosened by means of the screw $e$ at pleasure, and has a broad bearing against the side of the vessel, so that the weight of the vessel is not sustained upon the screw alone. This fastening is very strong, and will sustain a weight much greater than that of the vessel and any ordinary contents.

The edges of the countersink $b$ prevent the lug from turning when being fastened by the screw, and the head of the screw being countersunk presents an even and smooth surface on the inside of the vessel.

Fig. 3 shows the same device applied to securing a metallic pouring-spout, $i$, to the vessel. Other projections may be secured in like manner.

This invention is simple, cheap, and convenient, and saves the loss by breakage before mentioned.

The lug, handle, or other projection may be used with other vessels in case the one it is on is broken.

What I claim as my invention, and desire to secure by Letters Patent, is—

A metallic lug or similar projection for earthenware or like vessels, having a base-plate or broad bearing, in combination with a vessel having a countersink corresponding to base of the lug, and in which it is secured by a screw passing through a hole in the vessel and screwing into a hole in the base of the lug, substantially as and for the purposes described.

In testimony whereof I have hereunto set my hand.

WILLIAM H. ELVERSON.

Witnesses:
T. B. KERR,
JAMES H. PORTE.